United States Patent
Shimoji et al.

[11] Patent Number: 6,047,716
[45] Date of Patent: Apr. 11, 2000

[54] CLEANING TOOL FOR OPTICAL CONNECTORS

[75] Inventors: Naoko Shimoji, Ichihara; Masaaki Takaya; Shinji Nagasawa, both of Mito, all of Japan

[73] Assignees: The Furukawa Electric Co., Ltd.; Nippon Telegraph & Telephone Corporation, both of Tokyo, Japan

[21] Appl. No.: 09/021,110

[22] Filed: Feb. 10, 1998

[30] Foreign Application Priority Data

Feb. 14, 1997 [JP] Japan .................................. 9-030320

[51] Int. Cl.[7] ...................................................... B08B 3/00
[52] U.S. Cl. ................................. 134/166 C; 134/169 C; 134/201
[58] Field of Search ........................... 134/166 C, 168 C, 134/169 C, 201; 15/104.05

[56] References Cited

U.S. PATENT DOCUMENTS

| | | |
|---|---|---|
| 4,637,089 | 1/1987 | Schwarz . |
| 5,117,528 | 6/1992 | Kanayama et al. . |
| 5,220,703 | 6/1993 | Kanayama et al. . |
| 5,711,822 | 1/1998 | Burgett . |
| 5,768,738 | 6/1998 | Lee . |
| 5,906,686 | 5/1999 | McNeil . |

FOREIGN PATENT DOCUMENTS

| | | |
|---|---|---|
| 0223084 A1 | 5/1987 | European Pat. Off. . |
| WO 97/23792 | 7/1997 | WIPO . |

*Primary Examiner*—Frankie L. Stinson
*Attorney, Agent, or Firm*—Frishauf, Holtz, Goodman, Langer & Chick, P.C.

[57] ABSTRACT

A cleaning tool includes a support substrate, a cleaning member, a shaft member where the cleaning member is connected to one end of the shaft member detachably, and support member mounted to the a support substrate for supporting the one end of the shaft member with the cleaning member so that the shaft member and cleaning member are oscillated freely in a direction which intersects perpendicularly to an axial direction of the shaft member. The cleaning tool may be used to clean an end surface of a ferrule of the optical connector.

5 Claims, 5 Drawing Sheets

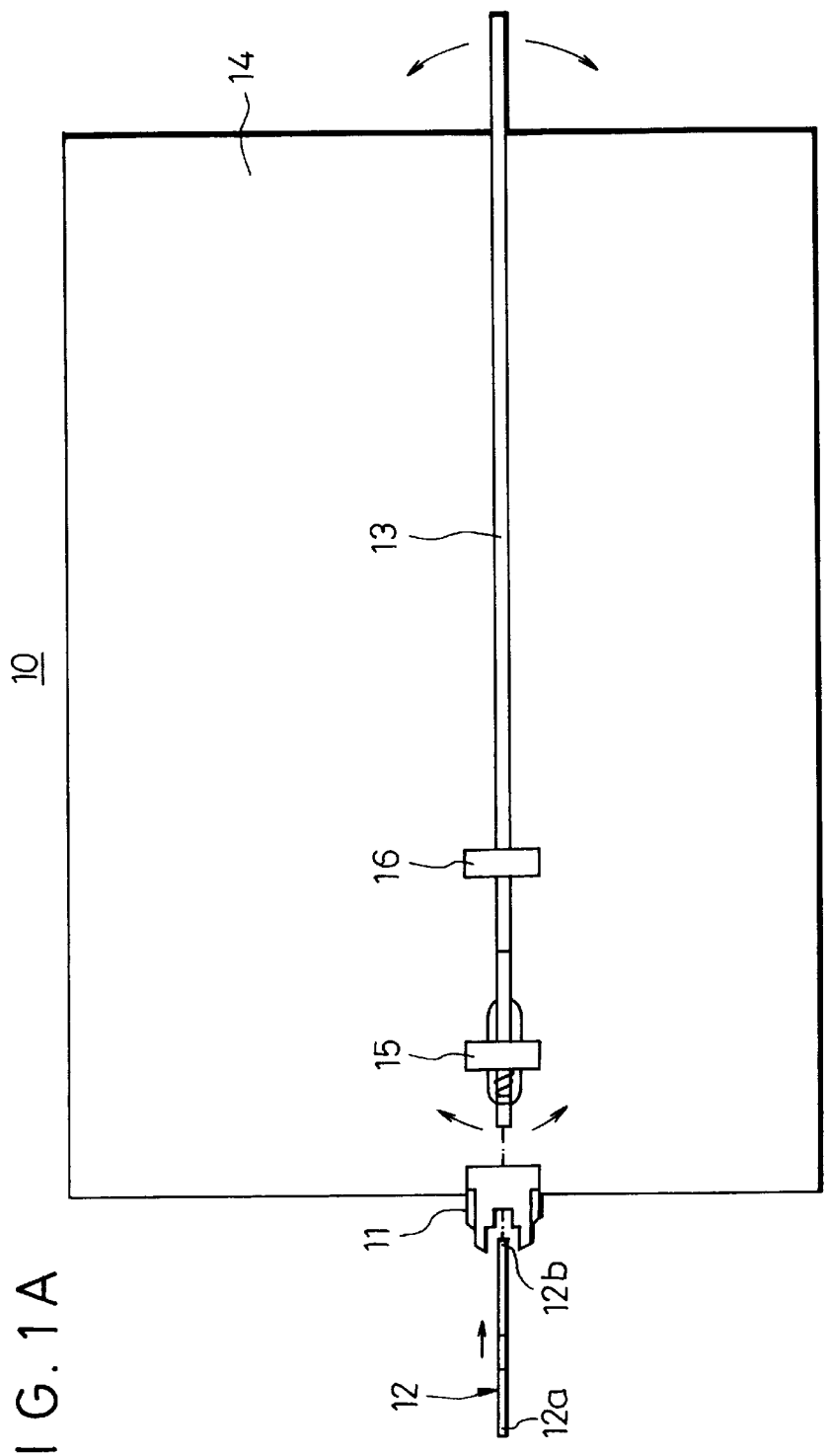
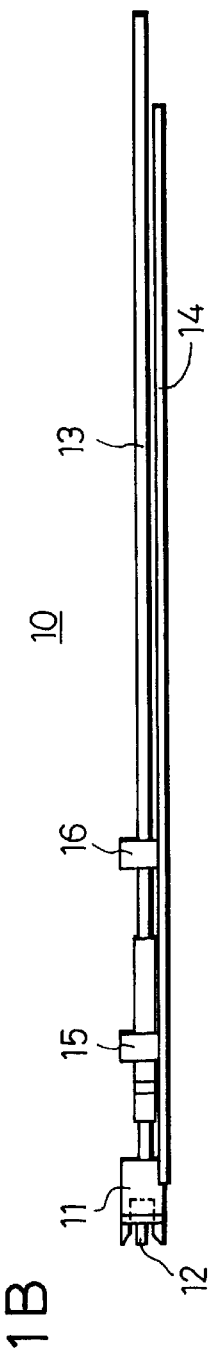
FIG. 1A
FIG. 1B

CLEANING TOOL FOR OPTICAL CONNECTORS

BACKGROUND OF THE INVENTION

1. Field of the Invention

The present invention relates to a cleaning tool for cleaning a connection end surface of a ferrule attached to an optical connector, and more specifically relates to, for example, a cleaning tool for an optical connector which cleans an end surface of a ferrule of an optical connector fixed to a substrate such as a backplane stored in optical transmission equipment.

2. Description of Related Art

In one method of connecting optical fibers, optical fibers are connected via an optical connector. In the optical connector connection in which optical fibers are connected via an optical connector, end surfaces of the optical fibers are directly and physically brought into contact with each other so that optical connection is obtained.

For this reason, when dust, etc. adhere to between the end surfaces of the optical fibers to be connected, defective connection is increased, namely, an optical connecting characteristic is deteriorated remarkably. Therefore, prior to the connection of the optical connector, the end surface of the ferrule of the optical connector to which the optical fibers are fixed is cleaned manually by using a cleaning member such as cleaning paper, and then the optical connectors are connected to each other.

In the case where the connection of the optical connectors is of a small scale, the aforementioned manual cleaning is not difficult, but in recent years, according to the development of optical information networks, peripheral equipment including optical connecting sections have become large in scale and high in density.

Meanwhile, the optical connectors have multifibers and have become high in density, so for example, the optical connectors have been used by mounting them to substrates such as printed panels, and integrating them in optical transmission equipments.

For example, FIG. 7 is a perspective view showing one example where the optical connectors are fixed to a substrate such as a printed panel and used in the optical transmission equipment.

Multifiber optical connector plugs 41 and 42 connected to each other have ferrules 41a and 42a and ribbon fibers 41b and 42b having a plurality of optical fibers (not shown), and the respective optical fibers are exposed on the connection end surfaces of the ferrules 41a and 42a.

A backplane 40 is packaged in the optical transmission equipment, and a housing 43 of the multifiber optical connector plug 41 is mounted to the backplane 40. The housings 43 whose number is the same as the multifiber connector plugs 41 are mounted, but in FIG. 7, in order to avoid complication of the drawing and to illustrate easily, only one housing is shown.

Meanwhile, a housing 45 of the multifiber optical connector plug 42 connected to the side edge is mounted to a printed board 44.

When the multifiber optical connector plug 41 is connected to the multifiber optical connector plug 42, the multifiber optical connector plug 41 is inserted into the housing 43 of the backplane 40, and the multifiber optical connector plug 42 is inserted into the housing 45 of the printed board 44. Then, the housing 43 and the housing 45 are fitted into each other so that the multifiber optical connector plugs 41 and 42 are connected to each other.

Prior to this connection, the connection end surfaces of the ferrules 41a and 42a of the multifiber optical connector plug 41 and the multifiber optical connector plug 42 are cleaned.

As mentioned above, for example, when the ferrule end surfaces of a plurality of the optical connectors fixed to the substrate such as a panel in the optical transmission equipment are cleaned, it is difficult to clean them one by one manually by inserting a hand with a cleaning member such as cleaning paper into the equipment in a conventional manner, and thus this is a troublesome process.

SUMMARY OF THE INVENTION

It is an object of the present invention to solve the above problem and to provide a cleaning tool which can clean an end surface of a ferrule of an optical connector simply and securely.

The present invention has the following means for solving the above problem.

A cleaning tool according to the present invention for cleaning an end surface of a ferrule of an optical connector is characterized by including a support substrate, a cleaning member, a shaft member where the cleaning member is connected to one end of the shaft member detachably, and a support member mounted to the support substrate for supporting the one end of the shaft member as well as the cleaning member so that the shaft member and cleaning member are freely oscillated in a direction which intersects perpendicularly to an axial direction of the shaft member.

The cleaning tool of the present invention can be characterized by further including a restraint member mounted to the support substrate for restraining the oscillation of the shaft member in the direction which intersect perpendicularly to the axial direction of the shaft member in a prescribed range.

The cleaning tool of the present invention can also be characterized in that a cleaning housing in which the optical connector is fitted is mounted to the support substrate.

In addition, the cleaning tool can be characterized in that the shaft member is formed in a pipe shape and the cleaning member is an injection nozzle.

In the cleaning tool of the present invention, the cleaning member can be oscillated freely in the direction intersecting perpendicularly to the axial direction of the shaft member. Therefore, the cleaning tool oscillates the shaft member in the direction intersecting perpendicularly to the axial direction of the shaft member using the support member as fulcrum so as to be able to clean the end surface of the ferrule of the optical connector. For this reason, in the cleaning tool of the present invention, or compared with the conventional method of manually cleaning the end surface of the ferrule using a hand with the cleaning member, the cleaning process is simpler, and thus the end surface of the ferrule can be cleaned securely. Moreover, in the cleaning tool of the present invention, since the cleaning member is connected to the shaft member detachably, the cleaning member can be replaced easily.

In the cleaning tool of the present invention, since the restraint member may be provided for restraining the oscillation of the shaft member in the direction intersecting perpendicularly to the axial direction within a prescribed range, the handling of the driving shaft becomes easy.

In addition, in the cleaning tool of the present invention, since, the cleaning housing in which the optical connector may be fitted is mounted to the support substrate. The cleaning tool can clean the end surface of the ferrule of the optical connector inserted in the other housing which is the cleaning housing simply and securely, by using the cleaning housing as a guide and oscillating the cleaning member connected to the driving shaft in a prescribed direction.

Still further, in the cleaning tool of the invention, since the shaft member may be formed in a pipe shape, and the cleaning member may be the injection nozzle the end surface of the ferrule of the optical connector can be cleaned simply and securely only by sending fluid from the pipe-type shaft member to the cleaning section and injecting the fluid to the end surface of the ferrule. Moreover, since the injected fluid does not damage the end surfaces of the optical fibers exposed on the end surface of the ferrule, the optical connector can be cleaned surely.

For a fuller understanding of the nature and advantages of the invention, reference should be made to the ensuing detailed description taken in conjunction with the accompanying drawings.

BRIEF DESCRIPTION OF THE DRAWINGS

FIG. 1A is a plan view showing one embodiment of a cleaning tool for optical connector according to the present invention, and FIG. 1B is a side view;

DETAILED DESCRIPTION OF THE PREFERRED EMBODIMENTS

Figure 2A:
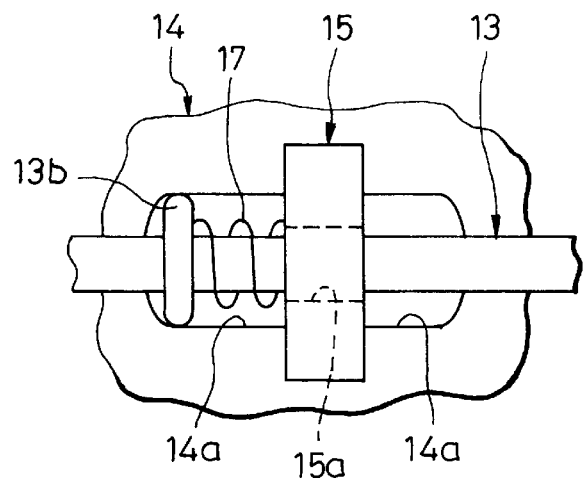
FIGS. 2A and 2B are respectively a plan view and vertical sectional view of a main section of the cleaning tool for optical connector in FIGS. 1A and 1B.

The following description of embodiments of the cleaning tool according to the present invention is given with reference to FIGS. 1 through 6.

A cleaning tool 10 for cleaning an optical connector (hereinafter, simply referred to as "cleaning tool") is shown in FIGS. 1A and 1B. The cleaning tool 10 has a cleaning housing 11, a cleaning member 12, and a driving shaft 13 for cleaning, and the cleaning housing 11, a support member 15 and a restraint member 16 are mounted to a support substrate 14.

The cleaning housing 11 is a member having a rectangular and tubular shape same as the that of a housing of a normal optical connector fixed to a side edge of the support substrate 14 by screws, and an optical connector plug is generally inserted into the cleaning housing 11. When, for example, the connector plug is of male type, the cleaning housing is of female type. When the connector plug is of female type, the cleaning housing is of male type. It is also possible to use such optical connector plug and the cleaning housing as not configured in male type and female type.

A forward end of the cleaning member 12 is a cleaning section 12a, and dust-free cleaning paper is wound around the cleaning section 12a. A backward end of the cleaning member 12 is a connecting section 12b for the driving shaft 13. The cleaning member 12 is generally connected to a forward end of the driving shaft 13, and the forward end is stored in the cleaning housing 11.

The driving shaft 13 is supported on the support substrate 14 by the support member 15 and restraint member 16, and it is arranged in a backward direction of the cleaning housing 11 (in FIGS. 1A and 1B, right side). The driving shaft 13 is a pipe-type member, and positioning rings 13a and 13b (see FIGS. 2A and 2B) are fitted to the forward end side of the driving shaft 13 on the side of the support member 15, and as shown in FIG. 1A, the cleaning member 12 is connected to the forward end of the driving shaft 13 detachably. As shown in the drawing, when the backward end side of the driving shaft 13 is oscillated in a direction along the surface of the support substrate 14 intersecting perpendicularly to the axial direction shown by an arrow, it is oscillated using the support member 15 as a fulcrum so that the cleaning member 12 connected to the forward end of the driving shaft 13 is rotated in the direction of the arrow.

As shown in FIG. 1A, the support substrate 14 is a rectangular plate, and a concave section 14a where the positioning rings 13a and 13b and a coil spring 17, mentioned later, are arranged is formed in the vicinity of the side edge of the support plate 14 to which the cleaning housing 11 is fixed.

Figure 2B:
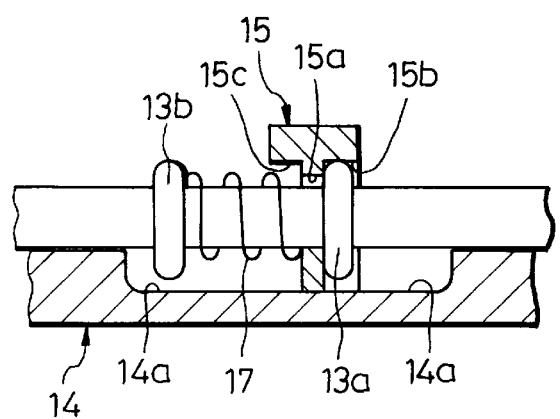

As shown in FIGS. 2A and 2B, the support member 15 is a member for supporting the forward end side of the driving shaft 13 with the cleaning member 12 so that they are oscillated freely in a prescribed angle range, and it is supported on the support plate 14 by machine screws, not shown. A through hole 15a through which the driving shaft 13 goes is formed in the support member 15, and depressions 15b and 15c which are slightly larger than the through hole 15a are provided to both sides of the through hole 15a. Here, as shown in FIG. 2B, the positioning ring 13a of the driving shaft 13 is fitted in one depression 15b and one end of the coil spring 17 is fitted in the other depression 15c, and the coil spring 17 is arranged between the positioning ring 13b of the driving shaft 13 and the depression 15c. As a result, the coil spring 17 presses the cleaning member 12 to be connected to the forward end of the driving shaft 13 against the cleaning housing 11 in the forward direction.

Figure 3:
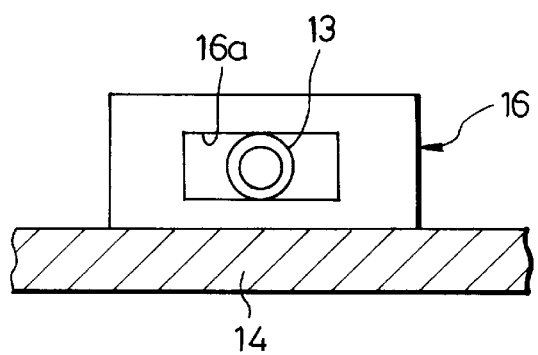
FIG. 3 is an enlarged drawing of another main section of the cleaning tool for optical connector in FIG. 1.
Figure 4:
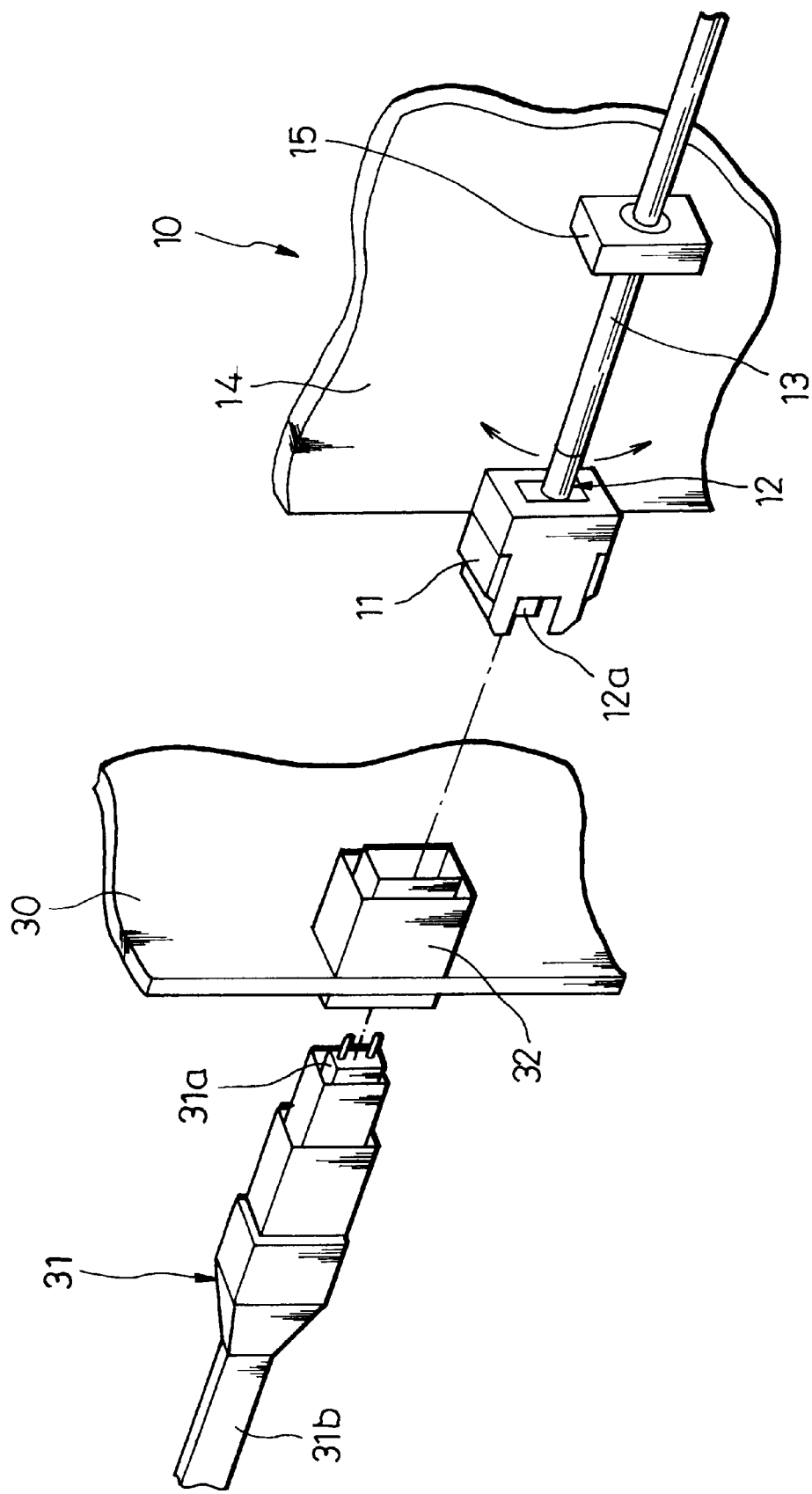
FIG. 4 is a perspective view showing a using state of the cleaning tool for optical connector of the present invention.

The restraint member 16 is a member for restraining the oscillation of the driving shaft 13 in the prescribed range, and as shown in FIG. 3, a rectangular through hole 16a through which the driving shaft 13 is pushed is formed at the center of the restraint member 16, and the restraint member 16 is fixed on the support substrate 14 by machine screws.

The cleaning tool 10 which was structured as mentioned above cleans the connection end surface of a ferrule 31a of a multifiber optical connector plug 31 as follows.

Here, the multifiber optical connector plug 31 is structured so that a ribbon fiber 31b is fixed to the ferrule 31a, and end surfaces of a plurality of optical fibers (not shown) composing the ribbon fiber 31b are exposed on the connection end surface. The multifiber optical connector plug 31 is structured so that the connector plug 31 is detachably inserted into a housing 32 mounted to a backplane 30 shown in FIG. 4, for example, packaged in the optical transmission equipment.

The cleaning tool 10 fits the cleaning housing 11 in the housing 32 mounted to the backplane 30 with the multifiber optical connector plug 31 being inserted into the housing 32. As a result, the cleaning section 12a at the forward end of the cleaning member 12 stored in the cleaning housing 11 contacts with the multifiber optical connector plug 31 with the connection end surface of the ferrule 31a being pressed.

Next, the backward end of the driving shaft 13 is oscillated in a direction intersecting perpendicularly to the axial direction of the driving shaft 13 within a slot 22a of the restraint member 16 with the cleaning section 12a pressing the connection end surface of the ferrule 31a. As a result, the driving shaft 13 oscillates the cleaning section 12a on its forward end side using the support member 15 as a fulcrum in the direction shown by the arrows which intersects perpendicularly to the axial direction of the cleaning member 12. As a result, the cleaning section 12 slides on the connection end surface of the ferrule 31a so as to clean it.

When the driving shaft 13 is oscillated, the cleaning section 12a is oscillated by using the cleaning housing 11 as a guide, so a portion of the connection end surface of the ferrule 31a which requires cleaning can be cleaned securely.

Here, in the aforementioned embodiment, the cleaning member 12 cleans the connection end surface of the ferrule 31a by directly bringing the cleaning section 12a around which the dust-free cleaning paper was wound into contact with the connection end surface, but it is not limited that the cleaning member directly comes in contact with the connection end surface of the ferrule 31a so as to clean it.

Figure 5:
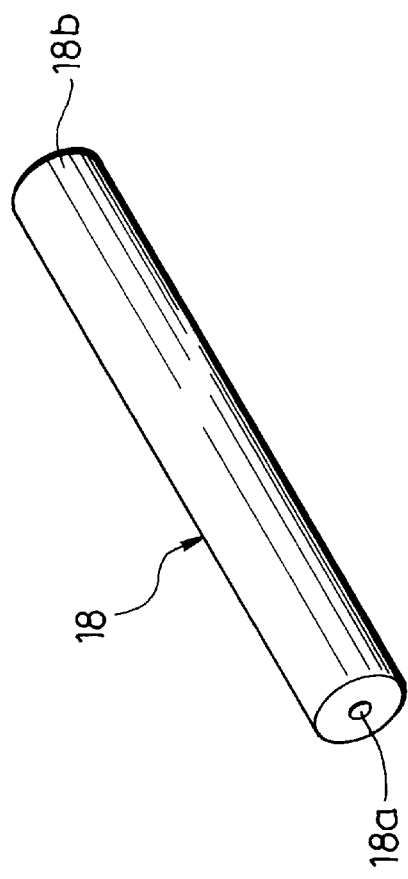
FIG. 5 is a perspective view showing another example of a cleaning member used by connecting it to a shaft member in the cleaning tool for optical connector of the present invention.

As a cleaning member for cleaning the connection end surface of the ferrule 31a with non-contact, for example, an injection nozzle 18 shown in FIG. 5 can be used. An injection hole 18a is formed at the forward end of the injection nozzle 18, and its backward end is a connecting section 18b connected to the forward end of the driving shaft 13. When the injection nozzle 18 is used as the cleaning member, it is arranged leaving a prescribed gap so that its forward end does not directly come in contact with the connection end surface of the ferrule 31a. Then, fluid such as gas and alcohol is sent from the pipe-type driving shaft 13, and when the fluid is injected from the injection hole 18a of the injection nozzle 18, the connection end surface of the ferrule 31a can be cleaned with non-contact securely.

When the cleaning member does not come in contact with the connection end surface of the ferrule 31a, the end surfaces of the optical fibers exposed on the connection end surface of the ferrule 31a are not damaged. For this reason, the connection end surface can be cleaned surely, and reliability of the cleaning tool 10 is improved.

Figure 6:
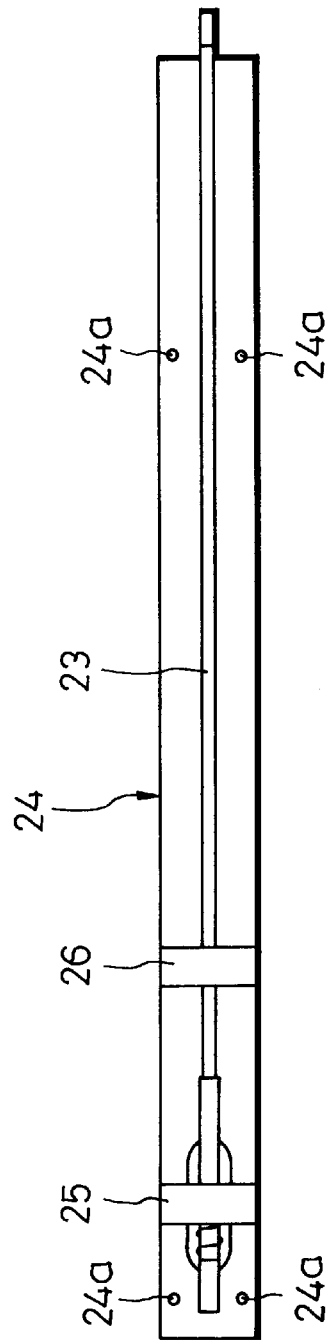
FIG. 6 is a plan view showing one section of another embodiment of the cleaning tool for optical connector according to the present invention.
Figure 7:
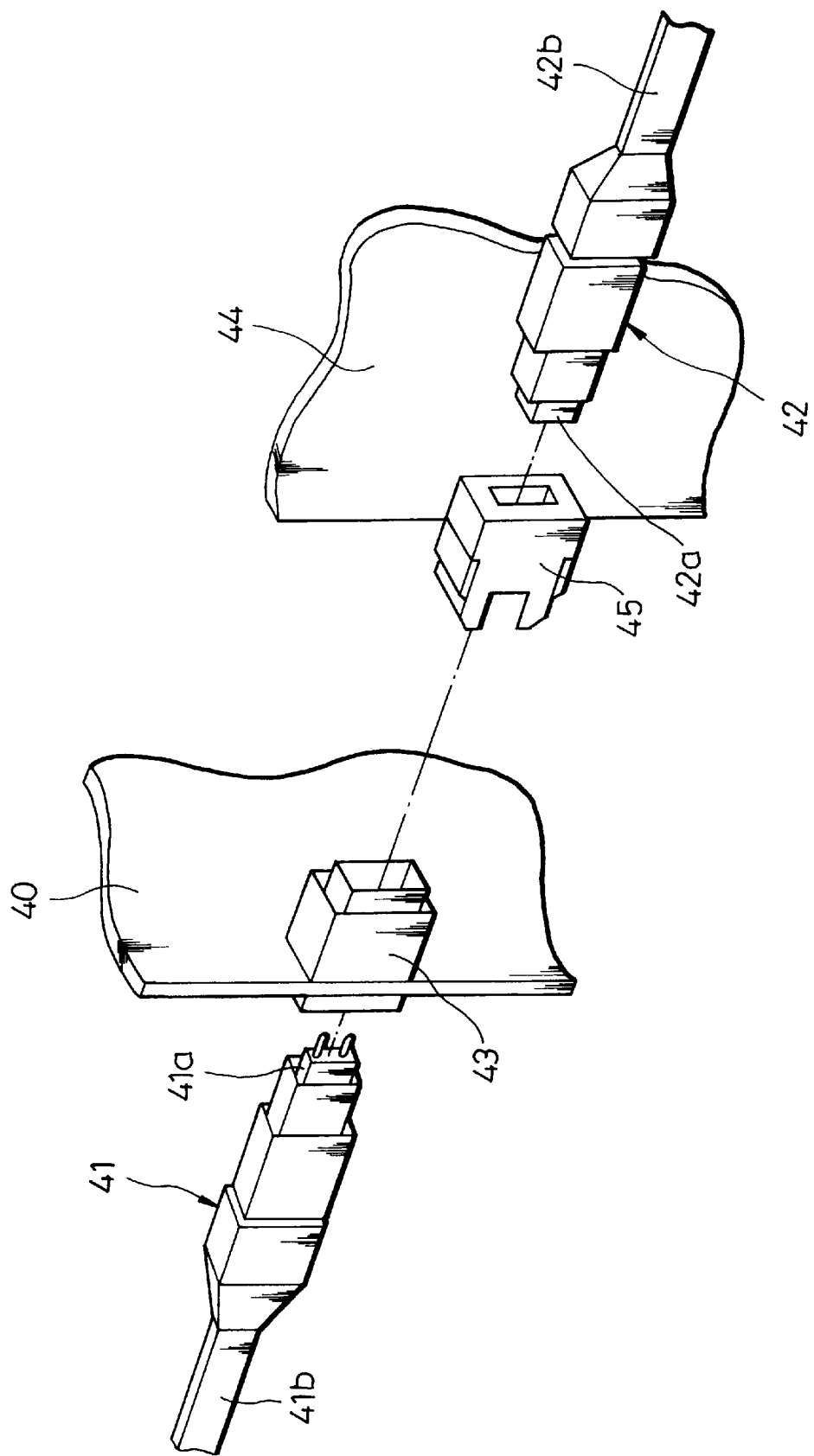
FIG. 7 is a perspective view showing a connecting state of the optical connector mounted to a printed panel, etc. in the equipment.

Further, in the aforementioned embodiment, the cleaning housing 11 and driving shaft 13 are mounted to the single support substrate 14, but like the cleaning tool 20 shown in FIG. 6, only the driving shaft 23 may be supported on the small-sized support substrate 24 by the support member 25 and restraint member 26.

Here, the driving shaft 23 is not shown, but similarly to the driving shaft 13, a cleaning member which is composed in the same manner as the cleaning member 12 is connected to the forward end of the support member 25. Moreover, machine screws holes 24a used for mounting the support substrate 24 to another substrate are provided to four parts of the support substrate 24.

As mentioned above, when only the driving shaft 23 is supported on the support substrate 24, the support substrate 24 is fixed to a substrate having the cleaning housing 11 by machine screws, etc. For example, as the substrate having the cleaning housing 11, a printed board can be used. A housing of an optical connector is mounted to the printed board, and a housing mounted to the backplane packaged in the optical transmission equipment is connected to the aforementioned housing of the optical connector. In this case, as the cleaning housing 11, the housing of the optical connector to be connected is used.

What is claimed is:

1. A cleaning tool for cleaning an end surface of a ferrule of an optical connector, comprising:

a support substrate having a cleaning housing in which an optical connector to be cleaned is fitted;

a cleaning member for cleaning an end surface of a ferrule of the optical connector fitted in the cleaning housing;

a shaft member having one end to which said cleaning member is detachably connected, and permitting a distal end of said cleaning member to be situated in the cleaning housing; and a support member mounted to said support substrate for supporting the one end of said shaft member with said cleaning member connected thereto so that said shaft member and said cleaning member are freely oscillated in a direction perpendicular to an axial direction of said shaft member.

2. The cleaning tool according to claim 1, further comprising a restraint member mounted to said support substrate for restraining the oscillation of said shaft member in the direction perpendicular to the axial direction of said shaft member in a prescribed range.

3. The cleaning tool according to claim 1, wherein said shaft member is formed in a pipe shape and said cleaning member comprises an injection nozzle.

4. The cleaning tool according to claim 2, wherein said shaft member is formed in a pipe shape and said cleaning member comprises an injection nozzle.

5. A cleaning tool for cleaning an end surface of a ferrule of an optical connector, comprising:

a support substrate;

a cleaning member for cleaning an end surface of a ferrule of an optical connector to be cleaned;

a shaft member having one end to which said cleaning member is detachably connected, and permitting a distal end of said cleaning member to be situated close to the end surface of the ferrule; and a support member mounted to said support substrate for supporting the one end of said shaft member so that said shaft member is freely oscillated in a direction perpendicular to an axial direction thereof.

* * * * *